United States Patent
Obaidi

(10) Patent No.: US 11,947,701 B2
(45) Date of Patent: Apr. 2, 2024

(54) TECHNIQUES FOR PREVENTING MALICIOUS USE OF BIOMETRIC DATA

(71) Applicant: T-Mobile USA, Inc., Bellevue, WA (US)

(72) Inventor: Ahmad Arash Obaidi, Sammamish, WA (US)

(73) Assignee: T-Mobile USA Inc., Bellevue, WA (US)

( * ) Notice: Subject to any disclaimer, the term of this patent is extended or adjusted under 35 U.S.C. 154(b) by 511 days.

(21) Appl. No.: 17/100,718

(22) Filed: Nov. 20, 2020

(65) Prior Publication Data

US 2022/0164470 A1   May 26, 2022

(51) Int. Cl.
| | |
|---|---|
| G06F 21/62 | (2013.01) |
| G06F 21/60 | (2013.01) |
| G06N 5/04 | (2023.01) |
| G06N 20/00 | (2019.01) |

(52) U.S. Cl.
CPC ........ G06F 21/6245 (2013.01); G06F 21/604 (2013.01); G06N 5/04 (2013.01); G06N 20/00 (2019.01)

(58) Field of Classification Search
CPC .... G06F 21/32; G06F 21/6245; G06F 21/604; G06N 20/00; G06N 5/04
See application file for complete search history.

(56) References Cited

U.S. PATENT DOCUMENTS

| | | | | |
|---|---|---|---|---|
| 9,846,716 B1* | 12/2017 | Scott | .................... | G06F 16/2365 |
| 9,898,619 B1* | 2/2018 | Hadsall | ................ | G06F 21/6245 |
| 10,360,369 B2* | 7/2019 | Lal | .......................... | H04L 9/083 |
| 2006/0210071 A1* | 9/2006 | Chandran | ........... | H04L 63/0428 |
| | | | | 380/42 |
| 2014/0003678 A1* | 1/2014 | Vieta | ................... | G06V 40/1335 |
| | | | | 382/124 |
| 2014/0033310 A1* | 1/2014 | Cheng | ................. | H04L 63/1416 |
| | | | | 726/23 |
| 2014/0283142 A1* | 9/2014 | Shepherd | ............ | G06F 3/04817 |
| | | | | 726/30 |
| 2016/0342608 A1* | 11/2016 | Burshteyn | ............. | G06F 16/122 |
| 2017/0046509 A1* | 2/2017 | Lal | ....................... | G06F 21/6218 |
| 2017/0200039 A1* | 7/2017 | Wright | .................... | G06V 40/50 |
| 2018/0109520 A1* | 4/2018 | Han | ........................ | G06F 21/62 |
| 2020/0302152 A1* | 9/2020 | Tagra | .................. | G06V 40/1371 |
| 2021/0099433 A1* | 4/2021 | Soryal | ................ | H04N 21/8166 |

\* cited by examiner

*Primary Examiner* — Kendall Dolly
*Assistant Examiner* — Thomas A Carnes

(57) ABSTRACT

Described herein are techniques for preventing software applications from gaining access to unauthorized biometric data in accordance with user preferences. In some embodiments, a software application requests access to sensor data collected by a sensor installed on a user device via a gateway application installed on the user device. Upon receipt of the request, the gateway application determines what types of biometric data the software application is authorized to obtain within the sensor data. The gateway application then identifies biometric data that is present within the sensor data. The sensor data is then altered such that biometric data that the software application is not authorized to obtain is obfuscated. Once the sensor data has been altered, the software application is provided access to that altered sensor data.

19 Claims, 6 Drawing Sheets

US 11,947,701 B2

TECHNIQUES FOR PREVENTING MALICIOUS USE OF BIOMETRIC DATA

BACKGROUND

Online commerce has experienced rapid growth in recent years. However, as online commerce has increased in popularity, occurrences of identity fraud have also increased. A number of sophisticated identity fraud techniques use biometric data collected from a user to simulate that user's identity. Accordingly, as fraud becomes increasingly sophisticated, biometric data associated with various consumers must be protected. However, consumers are often unable to prevent collection of such biometric data or may not even know that such biometric data is even being collected. In some cases, such biometric data may be collected by seemingly innocuous software applications installed on a user device.

SUMMARY

Techniques are provided herein for preventing software applications from gaining access to unauthorized biometric data in accordance with user preferences. In some embodiments, a software application requests access to sensor data collected by a sensor installed on a user device. The request is received by a gateway application installed on the user device. Upon receipt of the request, the gateway application determines what types of biometric data the software application is authorized to obtain within the sensor data. The gateway application then identifies biometric data that is present within the sensor data. The sensor data is then altered such that biometric data that the software application is not authorized to obtain is obfuscated. Once the sensor data has been altered, the software application is provided access to that altered sensor data.

In one embodiment, a method is disclosed as being performed by a gateway application installed upon a user device, the method comprising receiving a request to access data collected by a sensor device, the request originating from a software application, determining whether the software application has authorization to access one or more biometric features in the data, upon determining that the software application does have authorization to access the one or more biometric features, providing the software application with access to the data collected by the sensor device, and upon determining that the software application does not have authorization to access the one or more biometric features: altering the data by obfuscating the one or more biometric features within the data, and providing the software application with access to the altered data.

An embodiment is directed to a computing device comprising: a processor; at least one sensor device; and a memory including instructions that, when executed with the processor, cause the computing device to, at least, receive a request to access data collected by the at least one sensor device, the request originating from a software application installed in the memory, determine whether the software application has authorization to access one or more biometric features in the data, upon determining that the software application does have authorization to access the one or more biometric features, provide the software application with access to the data collected by the at least one sensor device, and upon determining that the software application does not have authorization to access the one or more biometric features: altering the data by obfuscating the one or more biometric features within the data, and providing the software application with access to the altered data.

An embodiment is directed to a non-transitory computer-readable media collectively storing computer-executable instructions that upon execution cause one or more computing devices to collectively perform acts comprising: receiving a request to access data collected by the at least one sensor device, the request originating from a software application installed in the memory, determining whether the software application has authorization to access one or more biometric features in the data, upon determining that the software application does have authorization to access the one or more biometric features, providing the software application with access to the data collected by the at least one sensor device, and upon determining that the software application does not have authorization to access the one or more biometric features: altering the data by obfuscating the one or more biometric features within the data, and providing the software application with access to the altered data.

Embodiments of the disclosure provide several advantages over conventional techniques. For example, the embodiments provide for the ability to prevent a software application from gaining unauthorized access to biometric data while still granting access to sensor data needed to perform its functionality. Accordingly, the embodiments enable a user of a user device to control what biometric data is able to be accessed on an application-by-application basis while enabling the user of the user device to continue to access the functionality provided by those applications.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure describes techniques for preventing a software application from accessing biometric data that it is not authorized to access. To do this, requests to access sensor data collected by input sensors on a user device are routed to a gateway application. The gateway application determines what biometric data the software application is authorized to access. Biometric data within the obtained sensor data that the software application is not authorized to access is then obfuscated by the gateway application and the software application is then provided access to the obfuscated sensor data.

In some embodiments, in order to access data collected by one or more sensors installed on a user device, a software application executing on the user device calls an application programming interface (API) associated with an operating system (OS) of the user device. More particularly, the software application may interact with a module of the OS that controls access to a sensor from which data is to be collected. That module of the OS may then forward the sensor data resulting from that interaction to the gateway application.

A gateway application, for the purposes of this disclosure, is a software application installed upon a user device that is configured to selectively obfuscate certain biometric data located within collected sensor data. A gateway application may be configured to determine what, if any, biometric data may be provided to a particular software application. The gateway application may also be configured to obscure any biometric data that is not to be provided to the software application based on user preferences. In some embodiments, the gateway application may be configured to interact with a remote support platform in order to determine what biometric data a software application is to be provided with access.

Figure 1:
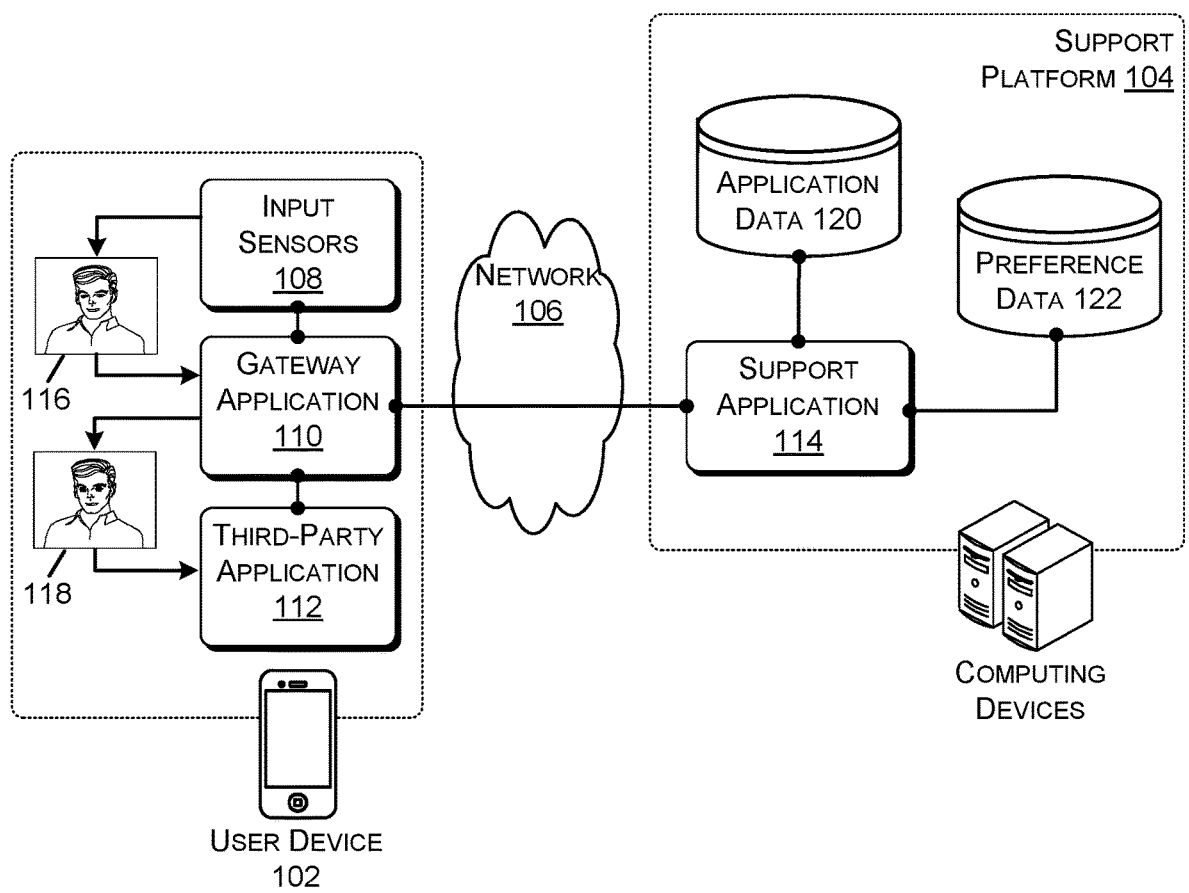
FIG. 1 illustrates an example architecture of a system that prevents unauthorized use of biometric data collected by a user device.

FIG. 1 illustrates an example architecture of a system that prevents unauthorized use of biometric data collected by a user device. In the system 100, a user device 102 is in communication with a support platform 104 via a network 106.

A user device 102 is any electronic device that is capable of obtaining biometric data for a user (e.g., an image of a user's face, etc.). Accordingly, the user device 102 may include a number of input sensors 108 capable of collecting information about an environment in which the user device 102 is located and/or a user of the user device 102. In some embodiments, a user device may include in its memory a software application that enables at least a portion of the functionality described herein (e.g., gateway application 110).

In some embodiments, one or more third-party software applications 112 may request access to information collected by the input sensors 108. The request for access may be routed to a gateway application 110. The gateway applications 110 may be configured to, upon receiving such a request, determine whether such access is to be granted to the third-party application 112 and to what extent. That determination may be made based on user preferences associated with an operator of the user device 102. In some embodiments, the gateway application may communicate with a support application 114 of the support platform 104 to make this determination. Upon determining that full access is to be granted to the third-party application 112, the gateway applications 110 may provide access to the unaltered information 116 collected by the input sensors 108. However, upon determining that limited access is to be granted to the third-party application 112, the gateway applications 110 may be further configured to alter or otherwise edit at least a portion of the information or the entirety of the information collected by the input sensors 108 and provide the altered information 118 to the third-party application 112.

A support platform 104 may be comprised of a number of computing devices and may provide backend support for a number of user devices. For example, the support platform 104 may be implemented as a software application installed upon a number of computing devices that execute instances of support software. In some embodiments, the computing devices may comprise a distributed network of computing nodes (e.g., a cloud computing environment).

The computing devices of the support platform 104 may include instructions that implement a support application 114. The support application 114 may be configured to determine whether a third-party application 112 is to be given access to biometric data collected via the input sensors 108. In some embodiments, this involves determining what biometric data is being collected by the third-party application 112 and how that biometric data is being used. In some embodiments, such information may be maintained by the support application in application data 120. For example, information may be collected and maintained regarding the types of data that are collected (e.g., facial features, eye tracking, etc.) as well as how that data is being used (e.g., authentication). Additionally, the support application 114 may obtain one or more user preferences associated with an operator of the user device 102 from preference data 122. In some embodiments, the support application 114 may make a determination as to what data can be provided to a particular software application based on the information obtained from the application data 120 as well as the user preference data 122.

Figure 2:
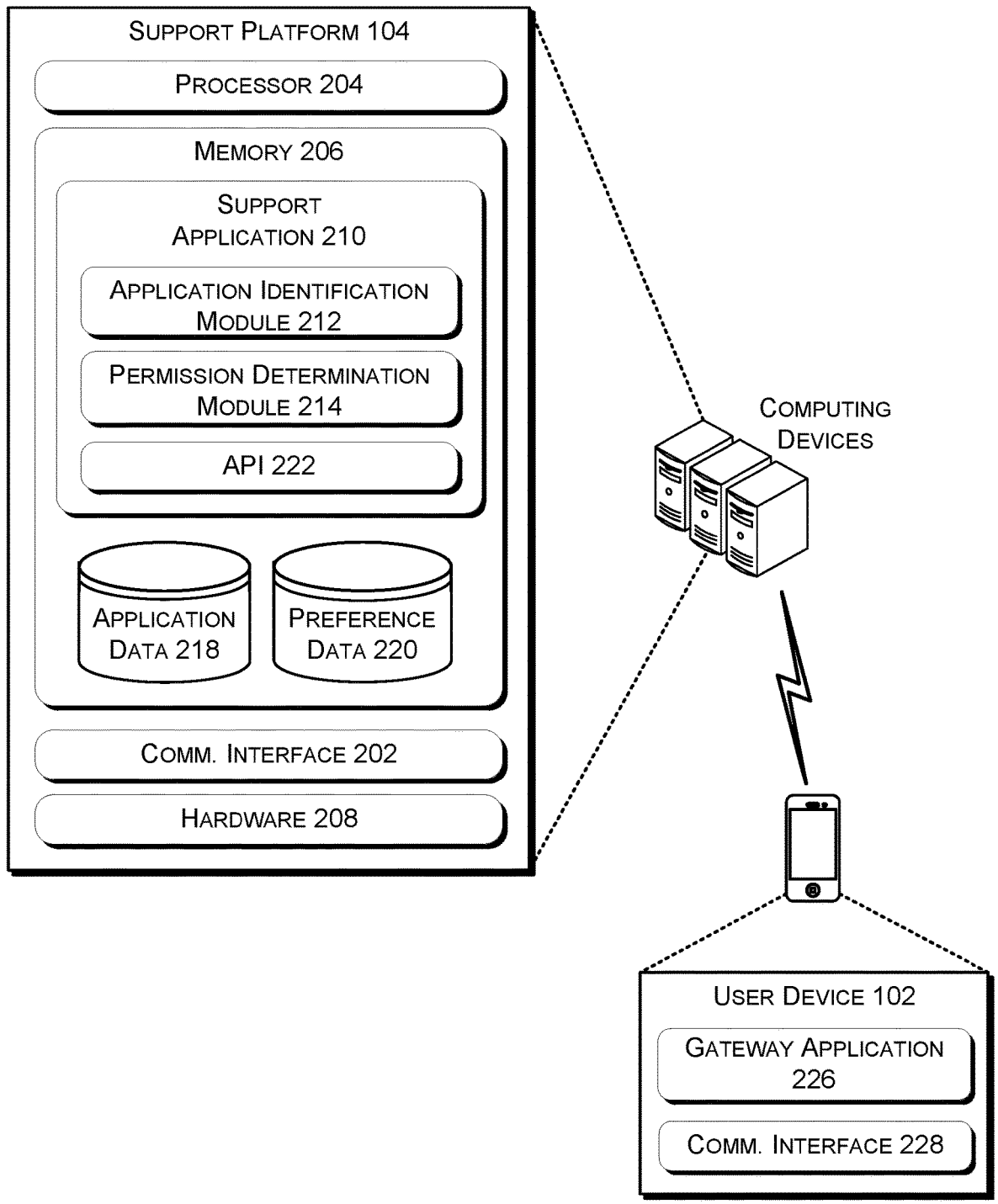
FIG. 2 is a block diagram showing various components of a computing system architecture that supports preventing malicious use of biometric data on a user device.

FIG. 2 is a block diagram showing various components of a computing system architecture that supports preventing malicious use of biometric data on a user device. The system architecture may include a support platform 104 that comprises one or more computing devices. The support platform 104 may include a communication interface 202, one or more processors 204, memory 206, and hardware 208. The communication interface 202 may include wireless and/or wired communication components that enable the support platform 104 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The support platform 104 can include any computing device configured to perform at least a portion of the operations described herein. The support platform 104 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The support platform 104 can include one or more virtual machines running virtual operating systems, or other computing architectures involving virtualization such as one or more flexible pools of logical storage devices that can be virtualized to maintain virtual storage devices for the computer. For example, the support platform 104 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the support platform 104 may implement functionality from a support application 210 that includes one or more software modules and data stores. Such software modules may include routines, program instructions, objects, and/or data structures that are executed by the processors 204 to perform particular tasks or implement particular data types. The support application 210 may include an application identification engine 212 that determines likely data usage for a software application and a permission determination engine 214 that determines what level of access a software application is to be granted. The memory 206 may additionally include various data stores, such as a database of application data 218 that indicates one or more types of data likely to be consumed by a software application and a database of preference data 220 that indicates biometric sharing preferences for one or more users/accounts.

The application identification engine 212 may be configured to, in conjunction with the processor 204, correlate various software applications with types of data usage. In some embodiments, this information may be provided to the support platform by an agent associated with the software application. In some embodiments, the application identification engine 212 may identify types of data usage for a software application based on usage patterns detected for that software application. For example, the application identification engine 212 may detect a type and quality (e.g., high resolution, low resolution, etc.) of data being collected by the software application as well as an amount of data being sent to a remote server. The application identification engine 212 may assign a high likelihood that a software application is collecting biometric data to the software application if it is collecting high-resolution data and providing the majority of that collected data to a remote server. In some embodiments, the application identification engine 212 may use one or more machine learning techniques to determine whether a software application is collecting biometric data. For example, the application identification engine 212 may compare data collection patterns for a software application for which data usage is unknown to data collection patterns for software applications for which data usage is known. By drawing comparisons between software applications having known data usage and software applications having unknown data usage, the application identification module is able to determine usage for those software applications having unknown data usage.

The permission determination engine 214 may be configured to, in conjunction with the processor 204, determine biometric data collection preferences for a user. In some embodiments, this may involve retrieving data collection preferences stored in preference data 220. Upon retrieving the data collection preferences, the permission determination engine 214 may identify a set of software applications that are (e.g. a whitelist) or are not (e.g., a blacklist) authorized to collect certain kinds of biometric data. In some embodiments, this set of software applications is then provided to the user device 102 for use by a gateway application 226. This is described in greater detail with respect to FIG. 3 below. In some embodiments, the permission determination engine 214 may receive (e.g., from a gateway application executed from a user device) a request to determine permissions for a particular software application that is currently attempting to access data. The permission determination engine 214 may then obtain, from the application data 218, an indication of types of data collection and usage by the software application as well as user biometric data collection preferences for the user (e.g., from preference data 220). The permission determination engine 214 may then determine whether the data collection and usage by the software application is in compliance with the data collection preferences for the user. If the collection and usage is not in compliance with the preferences, then the permission determination engine 214 may return, in response to the request, an indication of what biometric data is not to be provided to the software application.

The support platform may maintain one or more data repositories (e.g., 218 and 220) that store associations between various software applications and usage data. For example, the data repository may store an indication that a particular software application utilizes facial data for authentication purposes. In another example, the data repository may store an indication that a particular software application likely collects eye movement data. Additionally, the one or more data repositories may include information on user preferences for data sharing. For example, a user may elect to share facial data with a set of specified software applications and may elect not to share facial data with software applications outside of that set. In some embodiments, at least a portion of the maintained data may be provided by a separate entity. For example, an agent (e.g., a developer or manager) associated with a particular software application may provide information to the support platform on what information is used by the software application and in what way. In another example, a user may provide an indication of his or her preferences to the support platform. In some embodiments, at least a portion of the data stored in the data repositories may be provided to a user device.

In some embodiments, the support platform 104 may include an API 222 that facilitates interaction between the support platform and a gateway application 226 executed upon a user device 102. The API 222 may be accessed via a call to one or more functions provided by the support platform. In some embodiments, an account maintained by the support platform may be associated with a particular user device 102, such that any call to the API 222 that originates from the user device 102 may be attributed to the account. In some cases, the user may be required to log into an account using login credentials (e.g., a username and password) associated with the account.

The user may provide to the support platform an indication of his or her preferences regarding sharing of biometric information with various software applications. In some cases, this may involve the user making a selection from a user interface presented on the user device 102. In some cases, the user may select particular software applications that can or cannot be provided with biometric data. In some cases, the user may indicate what biometric data may be provided to a software application and for what uses.

The communication interface 228 may include wireless and/or wired communication components that enable the computing devices to transmit or receive data via a network, such as the Internet. In some embodiments, the communication interface 228 may include both short-range and long-range communication mechanisms. In some embodiments, communications between user devices may be established via a short-range communication mechanism of the communication interface 228 whereas communications between a user device and the support platform 104 may be established via a long-range communication mechanism.

The gateway application 226 may enable a user device 102 to interact with the support platform 104. For example, a communication session may be established between the support platform 104 and the user device 102 via the respective communication interfaces 202 and 228. In some embodiments, the gateway application 226 may provide a software application with access to either altered or unaltered data collected via sensors of the user device 102 based upon instructions received from the support platform. In some embodiments, the support platform may provide a subset of data to the user device to enable the gateway application 226 to operate independently. For example, the support platform may provide the user device with a set of software applications that can receive certain biometric data based on the user's indicated biometric data sharing preferences. In this example, the gateway application 226 may determine whether to alter collected sensor data based upon the inclusion (or exclusion) of the software application in the provided set of software applications without input from the support platform.

Figure 3:
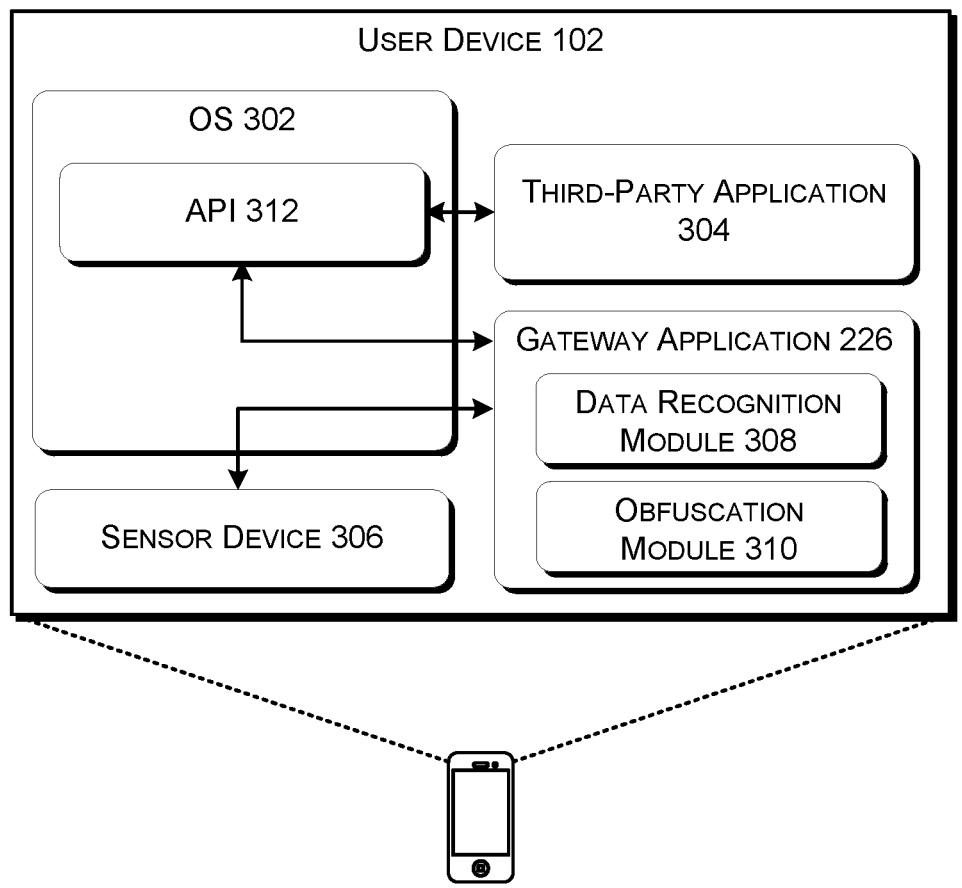
FIG. 3 depicts a block diagram showing an example process for altering sensor data to be provided to a third-party software application in accordance with some embodiments.

FIG. 3 depicts a block diagram showing an example process for altering sensor data to be provided to a third-party software application in accordance with some embodiments. More particularly, FIG. 3 illustrates a number of interactions that may occur between various components included in a user device, such as the user device 102 as described with respect to FIG. 1 and FIG. 2 above.

As described elsewhere, the user device may include (e.g., within its memory) an operating system (OS) 302 as well as a gateway application 226 and one or more third-party software applications 304. A third-party software application 304 may be any software application that is maintained by an entity other than the entity that maintains the gateway application 226. Additionally, the user device 102 may include one or more sensor devices 306 configured to capture information associated with a user and/or an environment in which the user is located. An example of such a sensor device 306 may include a camera device, a microphone, an inertial measurement unit (IMU), or any other suitable sensor device.

In some embodiments, the gateway application 226 may include a number of modules that each enable at least a portion of the functionality described herein. For example, the gateway application 226 may include a data recognition module 308 that identifies types of biometric data within sensor data as well as an obfuscation module 310 that obfuscates biometric data within sensor data.

The data recognition module 308 may be configured to identify biometric data within sensor data obtained via the sensor device 306. This may comprise using one or more machine learning algorithms that are trained to identify particular types of biometric data. In some embodiments, the objective of the data recognition module 308 is to identify biometric data within the sensor data. For example, where the sensor device 306 is a camera that captures image data, the data recognition module 308 may be configured to determine portions of the image data that contain certain facial features.

The obfuscation module 310 may be configured to obfuscate certain biometric data within collected sensor data. This may comprise identifying the biometric data within the sensor data received from the data recognition module 308 and then performing some obfuscation operation to the identified biometric data. In some embodiments, an obfuscation operation to be performed may be determined based on a type of sensor data to be altered and/or biometric data to be obfuscated. For example, the obfuscation module 310 may be configured to add noise to the sensor data where biometric data is identified within the sensor data. For example, if the sensor data comprises data received from a biometric sensor that includes a heart rate, a blood pressure reading, a gait pattern, a perspiration rate, an obfuscation operation may be performed in which the underlying data is altered to include random variances. In this example, the presence of a particular type of biometric data may be determined based upon the type of sensor being accessed. If the sensor data is image data, an obfuscation operation may comprise adding/altering pixels within the image data either randomly or pseudo-randomly at an area within the image that corresponds to the data to be altered. In this example, pixels located within some predetermined distance of an image portion determined to be associated with biometric data may be randomly replaced with pixels of other colors. Alternatively, the obfuscation module 310 may introduce a blurring effect at the area within the image that corresponds to the data to be altered (within some predetermined distance surrounding the biometric data). In another example, if the sensor data is audio data that includes spoken speech, the obfuscation operation may identify the spoken speech within the audio data (e.g., using one or more machine learning techniques) and may alter the identified spoken speech within the audio data. For example, the spoken speech may be altered by changing a pitch, frequency, or tone of the speech within the audio data.

By way of illustrating the various interactions between components of the user device 102, consider an example process in which a third-party software application 304 is provided with altered sensor data. In this example process, a third-party application 304 may request access to sensor data from a sensor device 306. To do this, the third-party application 304 may make a call to an application programming interface (API) 312 for the OS 302 that controls access to the sensor device 306.

Upon receiving this request, the API 312 may communicate an identity of the requesting third-party software application to a gateway application 226. The gateway application 226 then determines whether the third-party software application 304 is to be provided with access to certain types of biometric data as well as what types of biometric data the software application is not be provided access to. As noted elsewhere, this may comprise communicating with a support platform, such as support platform 104, that may determine what access is to be given to various software applications. In some embodiments, the gateway application 226 may maintain a list of software applications that are or are not authorized to access certain types of biometric data.

For the purposes of this example process, assume that a determination is made that the third-party application 304 is not to be provided with certain biometric data that may be included within sensor data obtained by the sensor device 306. In this example, sensor data collected by the sensor device 306 is obtained by the gateway application 226. Biometric data may be identified within the sensor data by the data recognition module 308 and a determination may be made that the identified biometric data is not to be provided to the third-party software application 304. Once the biometric data has been determined within the sensor data, that biometric data may be obfuscated by the obfuscation module 310 as described above. In this way, an altered version of the sensor data is generated, which is then provided to the third-party application 304 via the API 312 in response to the call made to the API.

Figure 4:
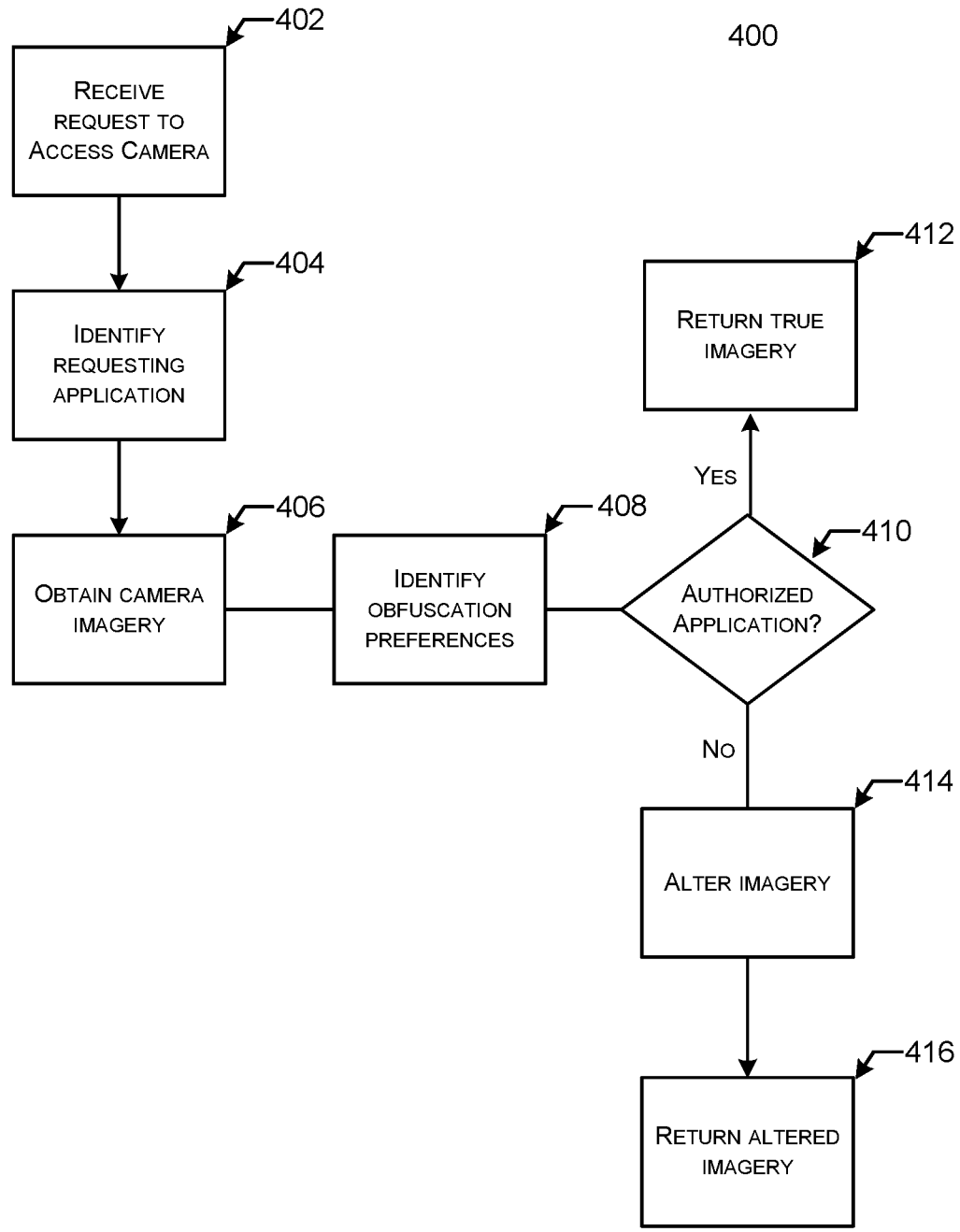
FIG. 4 depicts a block diagram showing an example process flow for selectively obfuscating biometric data within imagery in accordance with embodiments.

FIG. 4 depicts a block diagram showing an example process flow for selectively obfuscating biometric data within imagery in accordance with embodiments. The process 400 involves interactions between various components of the architecture 100 described with respect to FIG. 1. More particularly, the process 400 involves interactions between input sensors 108, a gateway application 110, and at least one third-party application 112. In FIG. 4, the process is described as being limited to selectively obfuscating biometric data within imagery captured by a camera on a user device. However, such limitation is only provided for illustrative purposes and one skilled in the art would recognize that the techniques described herein may be more broadly applied.

At 402, the process 400 comprises receiving, at a gateway application, a request to access a camera of a user device. As described elsewhere, such a request may be received via an API associated with an operating system of the user device on which the gateway application is installed. The operating system may forward any request from a software application not installed on the user device by the manufacturer to access the camera device to the gateway application.

At 404, the process 400 comprises identifying the requesting software application. In some embodiments, the received request may indicate an identity of a software application from which the request originated. In some embodiments, a requesting software application may be identified by determining what software applications are currently being executed on the user device and selecting a software application that is most likely to be the requesting software application from those determined.

At 406, the process 400 comprises obtaining imagery from a camera of the user device. This may involve activating the camera component of the user device and accessing an output provided by the camera component. Such output is comprised of imagery that includes a number of pixels, each of which are associated with particular coordinates within the imagery. Such imagery may be continuously updated dynamically. For example, the imagery may be streaming video imagery.

At 408, the process comprises identifying obfuscation preferences for a user. In some embodiments, such preferences may be stored in a memory of the user device. In some embodiments, such preferences may be retrieved from the support platform. In some cases, this may involve first identifying the user that is currently operating the user device and then retrieving preferences for that user. For example, a current user may be determined based on what account is currently logged in to the user device. In another example, biometric information (e.g., facial imagery) collected at 406 may be used to identify a current user of the device (e.g., using one or more facial recognition techniques).

At 410, the process 400 comprises determining whether the identified software application is authorized to access biometric data within the obtained imagery. In some embodiments, the gateway application submits a request to a support platform to receive an indication as to whether the software application is authorized to access biometric data. In some embodiments, the gateway application determines whether the software application is authorized to access biometric data based on its inclusion on, or exclusion from, a list (e.g., a whitelist or blacklist). In some embodiments, the gateway application determines what biometric data is used by the requesting software application (e.g., from the support platform) and determines whether the software application is authorized to do so based on the retrieved obfuscation preferences for the user.

Upon determining that the software application is authorized to access biometric data ("yes" from decision block 410), the process 400 comprises returning the unaltered camera imagery to the requesting software application at 412. In some cases, this may comprise providing the software with direct access to the imagery captured by the camera device.

Upon determining that the software application is not authorized to access biometric data ("no" from decision block 410), the process 400 comprises altering the obtained camera imagery at 414 to obfuscate any biometric data that the software application is not authorized to have access to. For example, the gateway application may identify a location of pixels representing the unauthorized biometric data within the obtained camera imagery using one or more object recognition techniques. The gateway application may then alter the camera imagery by obscuring the unauthorized biometric data within the obtained camera imagery. For example, the gateway application may pixelate or add noise to an area around the identified biometric data.

In some embodiments, the camera imagery may continue to be collected and altered by the gateway application over time. For example, the camera device may collect and provide a stream of imagery to the gateway application (e.g., streaming video). In this example, the gateway application may monitor a current location of pixels representative of the biometric data within the camera imagery as it is obtained from the camera device. For example, as the camera imagery is obtained, the gateway application may determine a current location of pixels representative of the biometric data within the imagery and may apply an obfuscating effect (e.g., blurring, pixilation, adding noise, etc.) to an area surrounding the determined current location of the pixels representative of the biometric data.

In some embodiments, multiple areas of the camera imagery may be obfuscated. For example, the requesting software application may not be authorized to access multiple types of biometric data that may each appear within the camera imagery. In another example, the camera imagery may include biometric data for multiple people and that biometric data may be obfuscated for each of those multiple people. Once the camera imagery has been altered, the process 400 comprises returning the altered camera imagery to the requesting software application at 416.

Figure 5:
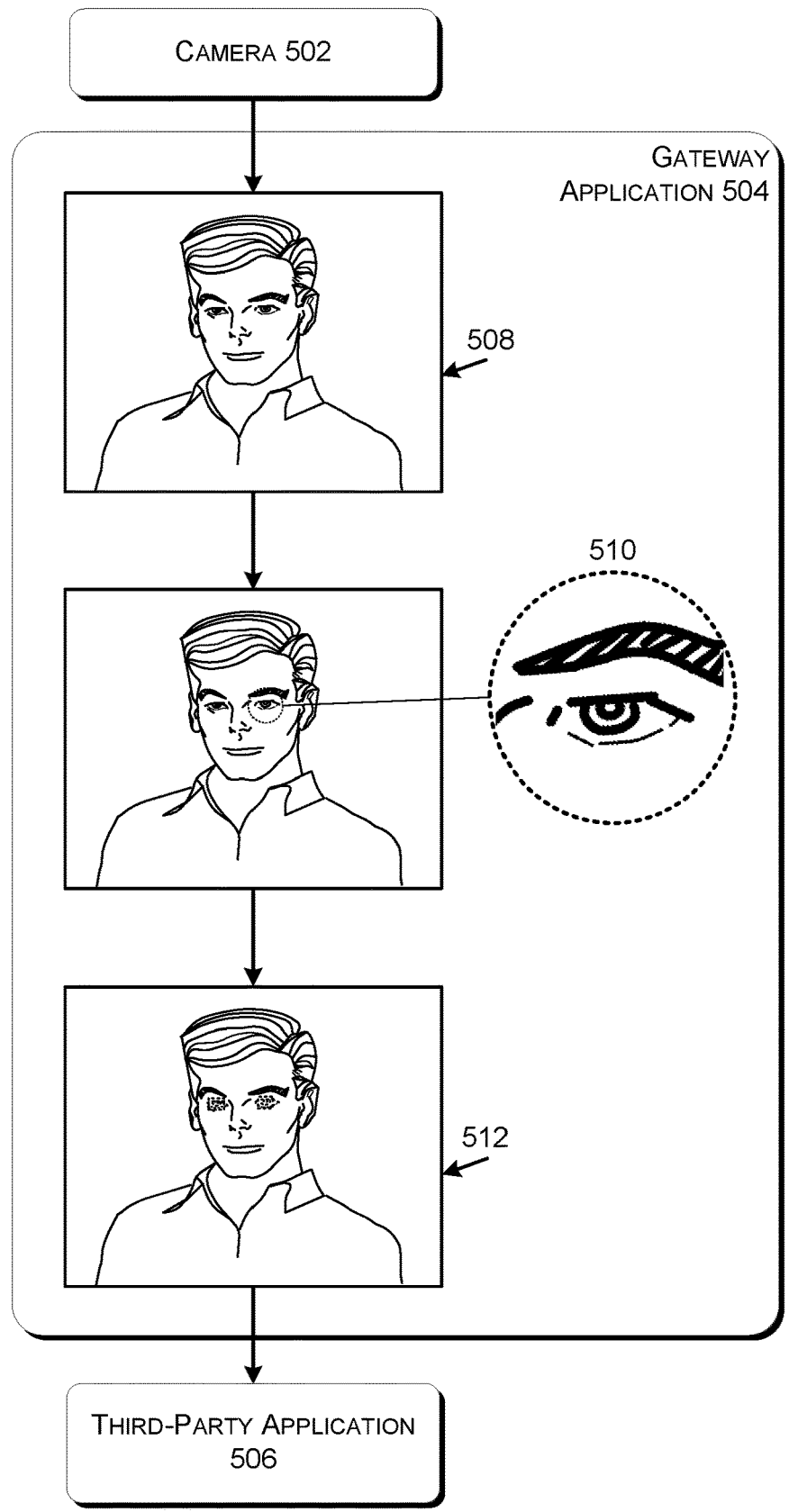
FIG. 5 depicts an illustrative example of a process in which biometric data may be obfuscated by a gateway application in accordance with at least some embodiments.

FIG. 5 depicts an illustrative example of a process in which biometric data may be obfuscated by a gateway application in accordance with at least some embodiments. In the example process, a camera 502 installed upon a user device captures imagery that may include images of a user or users. The captured imagery is then altered by a gateway application 504 configured to prevent access to unauthorized biometric data within the captured imagery. Once the captured imagery has been altered by the gateway application 504, it is provided to a third-party application 506 that requested access to the camera 502.

In the depicted process, a gateway application 504 gains access to an unaltered image 508 as captured by the camera 502. The gateway application then identifies one or more biometric data objects within the unaltered imagery that is not to be provided to a software application 506. This may involve the use of one or more object recognition techniques to identify features (e.g., facial features) associated with those biometric data objects. For example, biometric data that includes eye movement data that can be used for eye movement tracking may be associated with a user's eye area. In this example, the gateway application may identify a region 510 of the unaltered image 508 that includes an eye area. Such an eye area may be identified based on the region 510 matching an optical pattern that is similar to that of an eye. In some embodiments, such an optical pattern may be identified using a machine learning model that has been trained to recognize eye regions of a user.

Once the region 510 associated with the biometric data has been identified, an obfuscation technique is applied to that region. In some embodiments, this involves creating an overlay that includes image noise at the region 510. Image noise may include pixels selected randomly, pseudo randomly, or in some pattern that are distributed over the region. In some embodiments, this involves applying a blurring effect to the region by altering pixels by "blending" the colors of the pixels with the colors of pixels close by, thereby removing sharp edges within the region. An altered image 512 is then created by applying the created overlay to the unaltered image 508.

Once the altered image 512 has been created, it is provided to the third-party application 506 that requested access to the camera imagery. The third-party application 506 is then able to consume the image 512 during its operation. In this manner, the software application may be provided with, and use, the altered imagery 512 in a manner consistent with its function while being prevented from gaining access to biometric data that the user wishes to prevent the distribution of.

Figure 6:
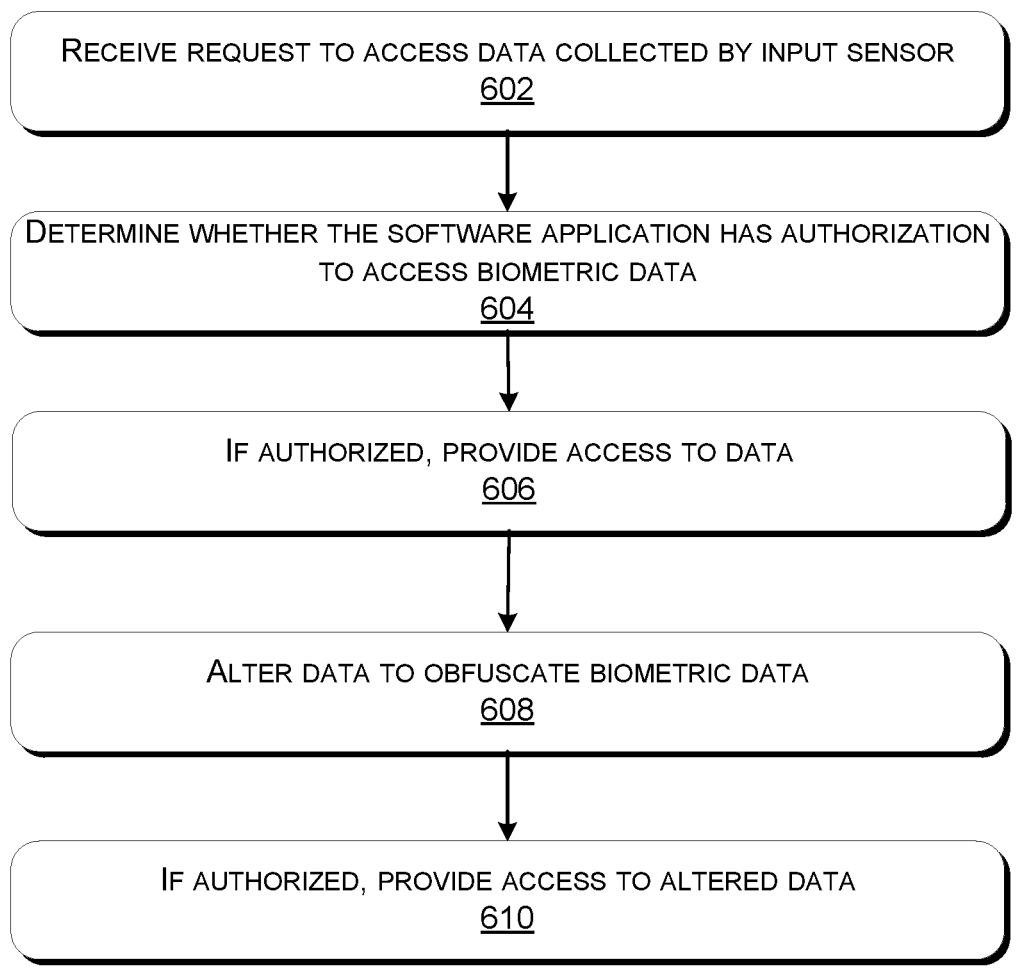
FIG. 6 depicts a block diagram showing an example process flow for managing access to biometric data within sensor data for a software application.

FIG. 6 depicts a block diagram showing an example process flow for managing access to biometric data within sensor data for a software application. In accordance with embodiments, the process 600 may be performed by various components of the architecture 100 described with respect to FIG. 1, such as input sensors 108, a gateway application 110, and at least one third-party application 112.

At 602, the process 600 comprises receiving a request to access data collected by one or more input sensor. The request is received by the gateway application from at least one third-party software application installed upon the user device. In some cases, the request to access data is received by the gateway application from an operating system of the computing device and the request to access data is received via an application programming interface associated with the operating system. In some embodiments, the input sensor comprises a camera and the data collected by the input sensor comprises image data.

At 604, the process 600 comprises determining whether the third-party software application has authorization to access certain biometric data. In some embodiments, the one or more biometric features are identified within the data using one or more machine learning techniques. In some embodiments, determining whether the software application has authorization to access one or more biometric features in the data comprises determining whether the software application is included within a list of software applications. For example, the list of software applications may be a whitelist comprising a set of authorized software applications and the software application may be determined to be authorized if it is included in that list. In another example, the list of software applications is a blacklist comprising a set of unauthorized software applications and the software application may be determined to be authorized if it is not included in that list. In some embodiments, determining whether the software application has authorization to access one or more biometric features in the data comprises communicating with a support platform. In some embodiments, the one or more biometric features comprises facial features associated with a person. In some cases, such facial features comprise an eye area of a face associated with the person.

At 606, the process 600 comprises, upon determining that the third-party software application does have authority to access biometric data, providing the third-party software application with access to the collected data. The altered data is then consumed by the software application during the course of its execution.

At 608, the process 600 comprises, upon determining that the third-party software application does not have authority to access biometric data, altering the data by obfuscating the one or more biometric features within the data. In some embodiments, obfuscating the one or more biometric features within the data comprises identifying a region within the image data associated with the one or more biometric features and applying an obfuscation technique to the region within the image data. In some cases, the obfuscation technique comprises one or more of blurring, pixilating, or adding noise to the region of the image data. In some embodiments, the region within the image data associated with the one or more biometric features is identified using one or more object recognition techniques.

At 610, the process 600 comprises providing the access to the altered data to the requesting third-party software application. In some embodiments, the data collected by the sensor is streaming video data. The process 600 may further comprise monitoring the one or more biometric features within the streaming video data and continuing to obfuscate the one or more biometric features within the streaming video data. In these embodiments, the streaming data may continue to be altered and provided to the requesting software application.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
   receiving, by a gateway application installed in a computing device, a request to access data collected by a sensor device on the computing device, the request originating from a software application installed in the computing device;

determining, by the gateway application, whether the software application has authorization to access one or more biometric features in the collected data;

upon determining that the software application does have authorization to access the one or more biometric features, providing, by the gateway application, the software application with access to the collected data; and upon determining that the software application does not have authorization to access the one or more biometric features:

altering, by the gateway application, the collected data by obfuscating the one or more biometric features within the collected data; and providing, by the gateway application, the software application with access to the collected data having the obfuscated one or more biometric features, wherein:

the collected data collected by the sensor device comprises image data; and obfuscating the one or more biometric features within the collected data comprises:

identifying a region within the image data associated with the one or more biometric features; and applying an obfuscation technique to the region within the image data.

2. The method of claim 1, wherein the one or more biometric features comprises facial features associated with a person.

3. The method of claim 2, wherein the one or more facial features comprises an eye area of a face associated with the person.

4. The method of claim 1, wherein the one or more biometric features are identified within the collected data using one or more machine learning techniques.

5. The method of claim 1, wherein the sensor device comprises a camera.

6. The method of claim 1, wherein the obfuscation technique comprises one or more of blurring, pixilating, or adding noise to the region of the image data.

7. The method of claim 1, wherein the region within the image data associated with the one or more biometric features is identified using one or more object recognition techniques.

8. A computing device comprising:

a processor;

at least one sensor device; and a memory including instructions that, when executed with the processor, cause the computing device to, at least:

receive a request to access data collected by the at least one sensor device, the request originating from a software application installed in the memory;

determine whether the software application has authorization to access one or more biometric features in the collected data;

upon determining that the software application does have authorization to access the one or more biometric features, provide the software application with access to the collected data; and upon determining that the software application does not have authorization to access the one or more biometric features:

alter the collected data by obfuscating the one or more biometric features within the collected data; and provide the software application with access to the collected data having the obfuscated one or more biometric features, wherein:

the collected data collected by the at least one sensor device comprises image data; and obfuscating the one or more biometric features within the collected data comprises:

identifying a region within the image data associated with the one or more biometric features; and applying an obfuscation technique to the region within the image data.

9. The computing device of claim 8, wherein the instructions comprise a gateway application different from the software application, and wherein the request to access data is received by the gateway application from an operating system of the computing device.

10. The computing device of claim 9, wherein the request to access data is received via an application programming interface associated with the operating system.

11. The computing device of claim 8, wherein determining whether the software application has authorization to access one or more biometric features in the collected data comprises determining whether the software application is included within a list of software applications stored in the memory.

12. The computing device of claim 11, wherein the list of software applications is a whitelist comprising a set of authorized software applications.

13. The computing device of claim 11, wherein the list of software applications is a blacklist comprising a set of unauthorized software applications.

14. The computing device of claim 8, wherein determining whether the software application has authorization to access one or more biometric features in the collected data comprises communicating with a support platform.

15. A non-transitory computer-readable media collectively storing computer-executable instructions that upon execution cause a computing device to perform acts comprising:

receiving, by a gateway application installed in the non-transitory computer-readable media on the computing device, a request to access data collected by at least one sensor device on the computing device, the request originating from a software application installed in the non-transitory computer-readable media on the computing device;

determining whether the software application has authorization to access one or more biometric features in the collected data;

upon determining that the software application does have authorization to access the one or more biometric features, providing, by the gateway application, the software application with access to the collected data; and upon determining that the software application does not have authorization to access the one or more biometric features:

altering, by the gateway application, the collected data by obfuscating the one or more biometric features within the collected data; and providing, by the gateway application, the software application with access to the collected data having the obfuscated one or more biometric features, wherein:
- the collected data collected by the at least one sensor device comprises image data; and
- obfuscating the one or more biometric features within the collected data comprises:
  - identifying a region within the image data associated with the one or more biometric features; and
  - applying an obfuscation technique to the region within the image data.

16. The non-transitory computer-readable media of claim 15, wherein the collected data is streaming video data.

17. The non-transitory computer-readable media of claim 16, wherein the instructions further cause the one or more computing devices to:
- monitor the one or more biometric features within the streaming video data; and
- continue to obfuscate the one or more biometric features within the streaming video data.

18. The non-transitory computer-readable media of claim 15, wherein the determination as to whether the software application has authorization to access one or more biometric features in the collected data is made based on user preferences.

19. The non-transitory computer-readable media of claim 15, wherein the altered collected data is consumed by the software application during the course of its execution.

* * * * *